May 20, 1924.

E. MUELLER

CONFECTION AND METHOD OF MAKING SAME

Filed Oct. 16, 1923

1,494,861

INVENTOR.
Ernst Mueller
By John W. Strehli
ATTORNEY.

Patented May 20, 1924.

1,494,861

UNITED STATES PATENT OFFICE.

ERNST MUELLER, OF CHEVIOT, OHIO.

CONFECTION AND METHOD OF MAKING SAME.

Application filed October 16, 1923. Serial No. 668,920.

*To all whom it may concern:*

Be it known that I, ERNST MUELLER, a citizen of the German Republic, who has made oath of his intention to become a citizen of the United States, residing at Cheviot, in the county of Hamilton and State of Ohio, have invented certain new and useful Improvements in Confections and Methods of Making Same, of which the following is the specification.

This invention relates to a confection for commercial use in the form of a cigar, stogie, plug tobacco, or any other article of a similar nature, having a base made of candy provided with an imitative wrapper or coating to simulate such a cigar, stogie, or the like, to a high degree, that the same will appear natural, thus forming the unique and palatable confection which can be eaten as a whole, without removing the wrapper, the wrapper becoming part of the confection itself and not remaining an extraneous part.

In the present instance, however, I have shown my invention as applied to a cigar or plug of tobacco in order to make a specific description of my invention.

In the present instance, the base or body of the confection is made of chocolate or chocolate material, although it may be made of any other confection.

This confection is covered with a wafer-like material, which is generally white in colour and is placed through a process of roasting or baking until it becomes a brown or tobacco-like colour, then it is steamed or placed into a solution having syrup of about 30% and in this state it is immediately wrapped upon the base of the confection to form a cigar, plug of tobacco, or the like, or any other form desired. This wafer being made of a material which is palatable really amalgamates with the outside of the base article and the two become a whole or unitary article of confection, thus the same may be eaten and all of the article is palatable.

Figure 1:
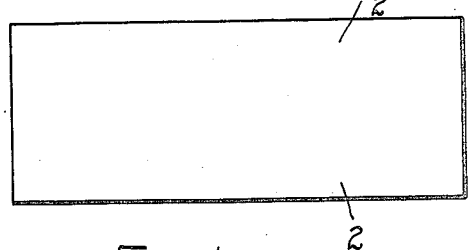
Figure 2:
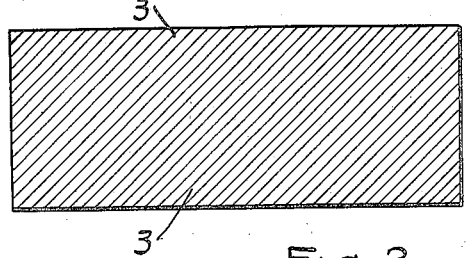
Figure 3:
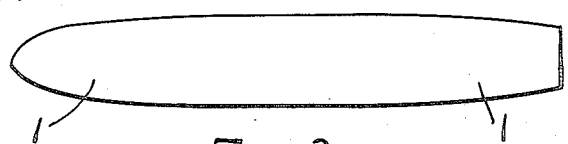
Figure 4:
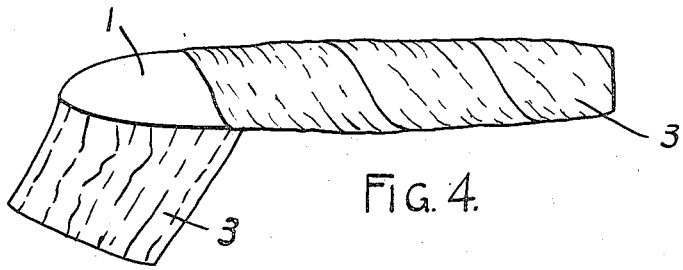
Figure 5:
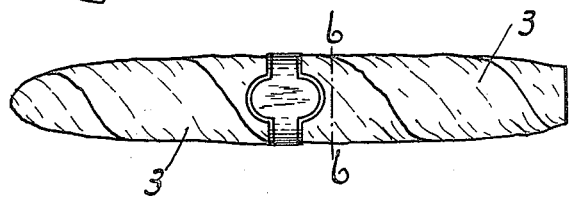
Figure 7:
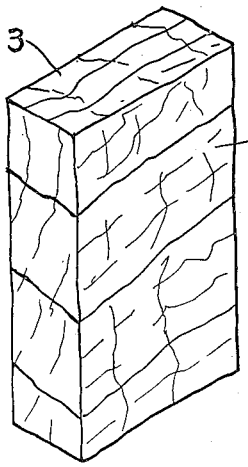
Figure 6:
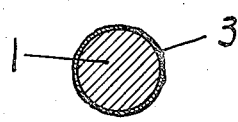

In the accompanying drawing forming part of this specification:

Fig. 1, is a plan view of one of the wafer wrappers,

Fig. 2, is a similar view except that the ime has been roasted and changed to a brownish colour, Fig. 3, is a view in elevation of a cigar-shaped confection, Fig. 4, is a similar view except that the wrapper has been partly placed thereon, Fig. 5, shows the completed confection, Fig. 6, is a section taken on the line 6—6 of Fig. 5, and Fig. 7, is an isometric view of a confection in imitation of a plug of tobacco with a wrapper thereon.

In the drawing 1, represents the base of the confection, 2, represents the palatable wafer, 3, represents the same wafer after the same has been roasted and when the same is ready to be steamed or dipped into a syrup or passes through an equivalent solution. The character 3, in Fig. 8, also represents the coating or roasted wafer material.

In the present instance, the body or base 1 of the confection is made of chocolate or chocolate material although the same may be made of any other confection-like body. The wafer material 2, can be made from any palatable material and is preferably very thin and while the same might be colored artificially, still I prefer to roast or bake the same until it becomes brownish or tobacco-like in appearance. When I steam it or moisten the same or dip it into a solution of which 30% is syrup, I then take this wafer paper in the form in which we now find the same and wrap it over the periphery of the chocolate base. It readily adheres to said base, inasmuch as it has an affinity for the same and clings very tightly thereto forming a part of said base. The whole can be eaten and it will be apparent that the same becomes a novel, unique, and palatable confection.

I may apply the wafer material wrapper to any other base, as for example, I show the same applied to a base which forms an imitation of a plug of tobacco as shown in Fig. 8.

I do not wish to confine myself to the exact details set forth herein for making said confection, but may deviate therefrom and still fall within the scope of the invention, the method and material used, however, being a preferable one.

What I claim as new and my invention and desire to secure by Letters Patent is:

1. An article of confection comprising a rigid edible core shaped to simulate a tobacco article, and a roasted wrapper of edible material enclosing said core and having an external tobacco color.

2. An article as claimed in claim 1 in which the core is formed of candy.

3. A method of making an article of confection consisting in forming a rigid edible core and shaping the same to simulate a tobacco article, providing a wafer-like cover of edible material, roasting said cover until it has a tobacco color, moistening the cover to render the same pliable, and then wrapping said cover about the core to form an edible article having the appearance of a tobacco article.

4. A method as claimed in claim 3 having the added step of dipping the cover in a solution containing syrup before placing the cover on the core.

5. A method of making a confection, consisting in forming a rigid core of chocolate candy into the shape of a cigar, making a wafer-like edible covering, roasting said covering to change the color of the same to a cigar wrapper color, moistening said covering, and then placing the covering around said core to form a complete cigar-shaped confection.

In testimony whereof, I affix my signature at Cincinnati, Ohio, this 12th day of October, 1923.

ERNST MUELLER.